United States Patent
Kang et al.

(10) Patent No.: US 9,900,238 B2
(45) Date of Patent: Feb. 20, 2018

(54) OVERLAY NETWORK-BASED ORIGINAL PACKET FLOW MAPPING APPARATUS AND METHOD THEREFOR

(71) Applicant: ELECTRONICS AND TELECOMMUNICATIONS RESEARCH INSTITUTE, Daejeon (KR)

(72) Inventors: Sae Hoon Kang, Daejeon (KR); Ji Young Kwak, Gwangju (KR); Ji Soo Shin, Daejeon (KR); Yong Yoon Shin, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 111 days.

(21) Appl. No.: 14/952,832

(22) Filed: Nov. 25, 2015

(65) Prior Publication Data

US 2016/0149795 A1   May 26, 2016

(30) Foreign Application Priority Data

Nov. 25, 2014   (KR) .................. 10-2014-0165576
Nov. 12, 2015   (KR) .................. 10-2015-0159181

(51) Int. Cl.
*H04L 12/28*   (2006.01)
*H04L 12/751*   (2013.01)
*H04L 12/721*   (2013.01)
*H04L 12/741*   (2013.01)
*H04L 12/713*   (2013.01)
*H04L 12/715*   (2013.01)

(52) U.S. Cl.
CPC .............. *H04L 45/02* (2013.01); *H04L 45/38* (2013.01); *H04L 45/586* (2013.01); *H04L 45/64* (2013.01); *H04L 45/74* (2013.01)

(58) Field of Classification Search
CPC ......... H04L 45/02; H04L 45/38; H04L 45/64; H04L 45/586; H04L 45/74; H04L 47/825
USPC ......................................... 370/254
See application file for complete search history.

(56) References Cited

U.S. PATENT DOCUMENTS 9,306,837 B1 *   4/2016   Jain ..................... H04L 45/16
9,397,946 B1 *   7/2016   Yadav ................ H04L 41/0806
9,609,021 B2 *   3/2017   Wanser .................. H04L 63/20
(Continued)

FOREIGN PATENT DOCUMENTS

KR   10-2013-0085617 A   7/2013

OTHER PUBLICATIONS

Horn et al. CSCO, "VXLAN Overview: Cisco Nexus 9000 Series Switches", Nov. 6, 2013 (From Applicant's IDS filed on Nov. 25, 2015).*

(Continued)

*Primary Examiner* — Mang Yeung
(74) *Attorney, Agent, or Firm* — LRK Patent Law Firm

(57) ABSTRACT

An original packet flow mapping apparatus and method based on an overlay network. The original packet flow mapping apparatus may include a packet-in message receiver, a flow controller, an overlay tunnel controller, and an interface, whereby flows can be identified even in a physical network segment on which an overlay link is implemented and then the flow can be mapped to an original flow.

14 Claims, 17 Drawing Sheets

(56) References Cited

U.S. PATENT DOCUMENTS

2013/0191477 A1 7/2013 You et al.
2013/0329728 A1 12/2013 Ramesh

OTHER PUBLICATIONS

Cisco Public Information, "VXLAN Overview: Cisco Nexus 9000 Series Switches", Cisco White Paper, 2013 Cisco and/or its affiliates.
F. Xia et al., "Quality of Service Marking in Virtual eXtensible Local Area Network", Network Working Group, Internet-Draft, Dec. 3, 2014.

* cited by examiner

FIG. 8

| TEP ID | TEP IP | TEP MAC |
|---|---|---|
| TEP-1 | ip-t1 | mac-t1 |
| TEP-2 | ip-t2 | mac-t2 |
| TEP-3 | ip-t3 | mac-t3 |
| ... | ... | ... |

FIG. 10

| VM MAC | VNID | TEP IP | TEP MAC |
|---|---|---|---|
| mac-a1 | 1000 | ip-t1 | mac-t1 |
| mac-a2 | 1000 | ip-t2 | mac-t2 |
| mac-a3 | 1000 | ip-t3 | mac-t3 |
| mac-b1 | 2000 | ip-t1 | mac-t1 |
| mac-b2 | 2000 | ip-t2 | mac-t2 |
| mac-b3 | 2000 | ip-t3 | mac-t3 |
| ... | ... | ... | ... |

FIG. 13A

| Key = HASH(Original Header's MACs, IPs) | VNID | S-MAC | D-MAC | S-IP | D-IP | UDP S-PORT |
|---|---|---|---|---|---|---|
| HASH(mac-a1, ff:ff:ff:ff:ff:ff, null, null) | 0x1000 | mac-t1 | mac-t2 | ip-t1 | ip-t2 | udp-p1 |
| HASH(mac-a2, mac-a1, null, null) | 0x1000 | mac-t2 | mac-t1 | ip-t2 | ip-t1 | udp-p2 |
| HASH(mac-a1, mac-a2, ip-a1, ip-a2) | 0x1000 | mac-t1 | mac-t2 | ip-t1 | ip-t2 | udp-p3 |
| HASH(mac-a2, mac-a1, ip-a2, ip-a1) | 0x1000 | mac-t2 | mac-t1 | ip-t2 | ip-t1 | udp-p4 |

FIG. 13B

| Key =<br>HASH(Original Header's MACs, IPs, and UDP S-PORT) | VNID | S-MAC | D-MAC | S-IP | D-IP |
|---|---|---|---|---|---|
| HASH(mac-t2, mac-t1, ip-t1, ip-t2, udp-p1) | 0x1000 | mac-a1 | ff:ff:ff:ff:ff:ff | null | null |
| HASH(mac-t2, mac-t1, ip-t2, ip-t1, udp-p2) | 0x1000 | mac-a2 | mac-a1 | null | null |
| HASH(mac-t1, mac-t2, ip-t1, ip-t2, udp-p3) | 0x1000 | mac-a1 | mac-a2 | ip-a1 | ip-a2 |
| HASH(mac-t2, mac-t1, ip-t2, ip-t1, udp-p4) | 0x1000 | mac-a2 | mac-a1 | ip-a2 | ip-a1 |
| ... | ... | ... | ... | ... | ... |

OVERLAY NETWORK-BASED ORIGINAL PACKET FLOW MAPPING APPARATUS AND METHOD THEREFOR

CROSS-REFERENCE TO RELATED APPLICATION(S)

This application claims priority from Korean Patent Application Nos. 10-2014-0165576, filed on Nov. 25, 2014, and 10-2015-0159181, filed on Nov. 12, 2015, in the Korean Intellectual Property Office, the disclosures of which are incorporated herein by references in its entirety.

BACKGROUND

1. Field

The following description relates to mapping of an original packet flow in an overlay network. More specifically, the following description relates to an apparatus and method for supporting flow-based networking services throughout an entire virtual network by mapping an original packet flow before encapsulation, which is extracted from an underlying physical network corresponding to an encapsulated packet flow that passes through an overlay link, to a flow of the physical network, in the case where a network overlay-based virtual network system is configured on the physical network.

2. Description of the Related Art

For network virtualization, various network overlay technologies, such as virtual extensible LAN (VXLAN), generic routing encapsulation (GRE), and stateless transport tunneling (STT), have been proposed.

Most of the aforesaid network overlay technologies use an encapsulation mechanism whereby a designated header to contain virtual network information is defined then is combined with an original packet header.

Specifically, GRE and STT use the same encapsulation header as long as tunnels have the same end point, even when flows of packets that pass an overlay link are different from each other.

By contrast, in VXLAN, when original flows on a virtual network are different, UDP source port numbers of encapsulation headers are set differently, so that a physical network can recognize that the original flows are different.

However, in a situation where different networking services are required by different virtual networks, extraction of an original packet flow is needed so as to allow the physical network to identify to which virtual network a packet that passes through a tunneling segment is belonging.

In VXLAN, one tunnel end point (TEP)-to-TEP overlay link can be shared for any tunneling services for all virtual machines that are connected to pertinent TEPs, regardless of a virtual segment to which said virtual machines are belonging. In addition, since only an outer header of a packet can be viewed in an underlying physical network, it is not possible to check original flow information of said packet, and hence it is difficult to provide various original flow-based services in the physical network.

SUMMARY

The following description relates to an apparatus and method for creating and providing mapping information between a virtual network flow and a flow on a physical network by extracting original flow information of an overlay tunnel-encapsulated packet, such that various original flow-based services can be provided throughout an entire end-to-end segment of a virtual network, which is constructed using a network overlay, in a software-defined network (SDN) environment established using the physical network.

In one general aspect, there is provided an original packet flow mapping apparatus based on an overlay network, including: a packet-in message receiver configured to receive a packet-in message using a communication protocol; a flow controller configured to manage connection information between switches or between virtual machines and switches, calculate a forwarding path based on the packet-in message, and transmit a flow entry to at least one switch belonging to the packet forwarding path, according to the connection information; an overlay tunnel controller configured to manage at least one piece of mapping information between tunnel end points (TEPs) and at least one piece of mapping information between a virtual machine and a TEP, and create or remove an overlay tunnel between TEPs according to the mapping information; and an overlay packet flow mapper configured to receive an encapsulated packet-in message, extract original flow and original packet flow information from the encapsulated packet-in message, and create mapping information by mapping an original packet flow and the physical network.

In another general aspect, there is provided an original packet flow mapping method based on an overlay network, including: receiving a packet-in message using a communication protocol; managing connection information between switches or between virtual machines and switches, calculating a forwarding path based on the packet-in message, and transmitting a flow entry to at least one switch belonging to the packet forwarding path, according to the connection information; managing at least one piece of mapping information between tunnel end points (TEPs) and at least one piece of mapping information between a virtual machine and a TEP, and creating or removing an overlay tunnel between TEPs according to the mapping information; and receiving an encapsulated packet-in message, extracting original flow and original packet flow information from the encapsulated packet-in message, and creating mapping information by mapping an original packet flow and the physical network.

Other features and aspects will be apparent from the following detailed description, the drawings, and the claims.

BRIEF DESCRIPTION OF THE DRAWINGS

FIG. 8 is a diagram illustrating a tunnel end point (TEP) table included in the overlay tunnel controller.

FIG. 10 is a diagram illustrating a virtual machine table stored in the overlay tunnel controller of FIG. 2.

FIG. 13A is a diagram illustrating an original2physical (O2P) flow table according to an exemplary embodiment.

FIG. 13B is a diagram illustrating a physical2original (P2O) flow table according to an exemplary embodiment.

Figure 1:
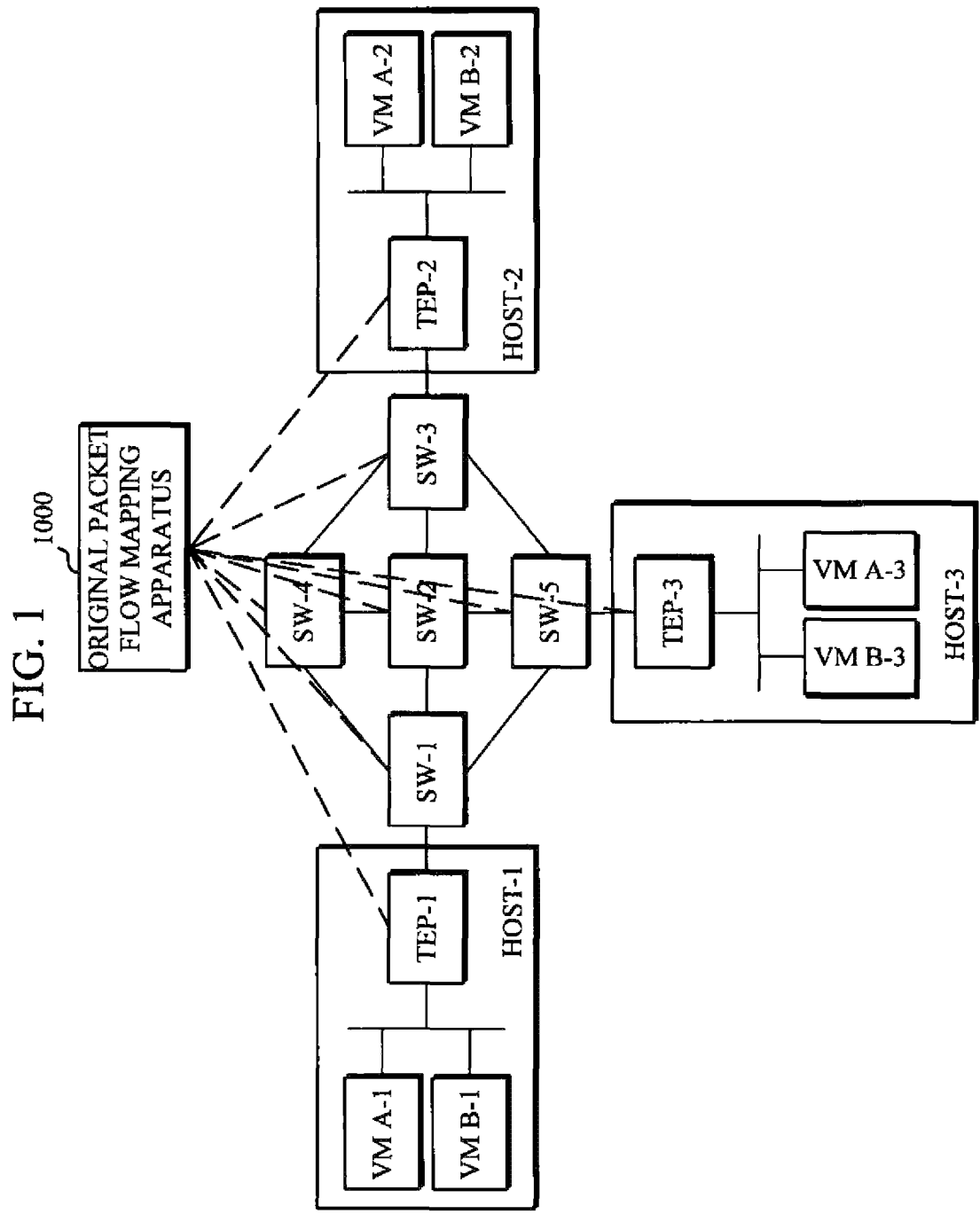
FIG. 1 is a diagram illustrating an overlay network-based original packet flow mapping apparatus according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, an overlay network-based original packet flow mapping apparatus and a method thereof according to exemplary embodiments of the present disclosure will be described with reference to the accompanying drawings.

FIG. 1 is a diagram illustrating an overlay network-based original packet flow mapping apparatus according to an exemplary embodiment.

Referring to FIG. 1, five software-defined network (SDN) switches constitute a physical network, three tunnel endpoints (TEPs) are connected to the physical network, and these devices are under control of the original packet flow mapping apparatus 1000.

The overlay network-based original packet flow mapping apparatus 1000 according to the exemplary embodiment may be connected to a plurality of switches, and each switch may be connected to at least one TEP.

The TEP refers to a device that can perform Internet protocol (IP)-over-IP packet encapsulation or media access control (MAC)-over-IP packet encapsulation and IP tunneling, which are required for implementation of virtual L2 segments, and it may be connected to at least one virtual machine.

According to the exemplary embodiment, a virtual switch with a hypervisor connected to a virtual machine may be used. According to another exemplary embodiment, a separate physical node, such as a top-of-rack (ToR) switch may be used.

In addition, the TEP has to have mapping information between virtual machines and TEPs in order to relay packet communications between the virtual machines, and the mapping information may be obtained through communications with other TEPs or received from a third party server.

According to the exemplary embodiment, the TEP refers to a device that can perform packet encapsulation and tunneling. In the exemplary embodiment, the TEP may operate based on virtual extensible LAN (VXLAN), but aspects of the present disclosure, such that other network may be applicable as long as a field value of an encapsulation header is changed according to an original flow.

Also, in the exemplary embodiment, the TEP may serve as a switch under control of the original packet flow mapping apparatus 1000, as well as perform packet encapsulation for network virtualization.

According to the exemplary embodiment, the TEPs may exchange information with each other regarding virtual machines that each TEP manages through a multicast channel on the physical network, and the mapping information of the TEP regarding the mapping between the virtual machine and the TEP may be under the centralized control of the original packet flow mapping apparatus 1000.

Figure 2:
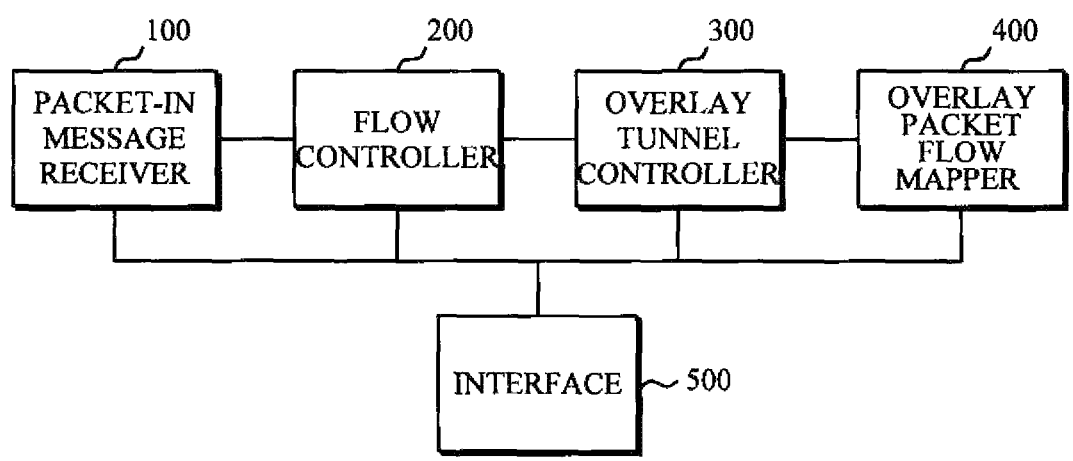
FIG. 2 is a diagram illustrating a configuration of the overlay network-based original packet flow mapping apparatus of FIG. 1.

FIG. 2 is a diagram illustrating a configuration of the overlay network-based original packet flow mapping apparatus of FIG. 1.

Referring to FIG. 2, the original packet flow mapping apparatus 1000 may include a packet-in message receiver 100, a flow controller 200, an overlay tunnel controller 300, and an overlay packet flow mapper 400.

The packet-in message receiver 100 may receive a packet-in message using a communication protocol.

According to the exemplary embodiment, the packet-in message receiver 100 may serve to communicate with a switch using a communication protocol, as well as to forward a packet-in message received from the switch to other modules.

The flow controller 200 may manage connection information between switches or connection information between virtual machines and switches, calculate a forwarding path based on the packet-in message, and transmit a flow entry to at least one switch belonging to the packet forwarding path according to the connection information.

According to the exemplary embodiment, the flow controller 200 may manage topologies and the devices connected to the switches and set up forwarding rules.

In addition, the flow controller 200 may include connection information manager 210, a path calculator 220, and a flow handler 230.

The flow controller 200 will be described in detail below with reference to FIG. 3.

The overlay tunnel controller 300 may manage at least one piece of mapping information between TEPs and at least one piece of mapping information between a virtual machine and a TEP, and create or remove an overlay tunnel between the TEPs according to the mapping information.

According to the exemplary embodiment, the overlay tunnel controller 300 may build a tunnel between the TEPs, and manage mapping information between the virtual machines and the TEPs, as well as create or remove a tunnel port of the TEP device according to information about managed TEPs and the mapping information between the virtual machines and the TEPs.

The overlay tunnel controller 300 will be described m detail below with reference to FIG. 5.

The overlay packet flow mapper 400 may receive an encapsulated packet-in message, extract original flow and information about original packet flow (hereinafter, referred to as "original packet flow information") from the encapsulated packet-in message, and create mapping information by mapping the original packet flow and the physical network.

According to the exemplary embodiment, the overlay packet flow mapper 400 may extract the original flow from the received encapsulated packet-in message that has passed an overlay link, and the overlay packet flow mapper 400 may parse information about the original flow (hereinafter, will be referred to as "original flow information") by parsing encapsulated packets.

In addition, the overlay packet flow mapper 400 may create and manage mapping information by mapping the original packet flow to the corresponding packet flow in the physical network on which the overlay link is implemented.

The overlay packet flow mapper 400 will be described in detail below with reference to FIG. 6.

According to the exemplary embodiment, the original packet flow mapping apparatus 1000 may further include an interface 500 to receive various requests from a user, the requests including a request for collecting network status information regarding topology and traffic, a request for path control for a specific flow, a request for creation of a virtual network, and a request for virtual machine information.

The interface 500 may be an open application program interface (API), delivering various requests to an SDN controller, and an external SDN application that uses various services provided by the SDN controller may request the SDN controller for a desired service through an open API, such as REST API.

The examples of services may include, but not limited to, a request for network status information regarding topology and traffic quantity, a request for path control for a specific flow, creation of a virtual network, and delivery of information about virtual machines belonging to the virtual network.

Figure 3:
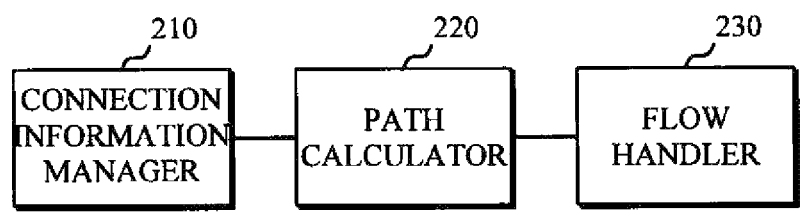
FIG. 3 is a diagram illustrating in detail the flow controller of FIG. 2.

FIG. 3 is a diagram illustrating in detail the flow controller of FIG. 2.

Referring to FIG. 3, the flow controller 200 may include connection information manager 210, a path calculator 220, and a flow handler 230.

The connection information manager 210 may include a link table to manage connection information between switches and a device table to manage connection information between switches and virtual machines.

The path calculator 220 may calculate a packet forwarding path that includes at least one switch, using a header of the received packet-in message.

According to the exemplary embodiment, the path calculator 220 may calculate the packet forwarding path based on information about outer header of a VXLAN packet, and the packet forwarding path may include information regarding connection information of switches.

The flow handler 230 may transmit the flow entry corresponding to a flow to at least one switch belonging to the packet forwarding path.

According to the exemplary embodiment, the flow handler 230 may forward the flow entry to at least one switch (e.g., SW-1, SW-2, and SW-3) that belongs to the corresponding packet forwarding path.

Figure 4:
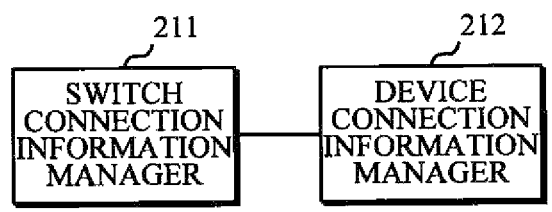
FIG. 4 is a diagram illustrating in detail the connection information of FIG. 3.

FIG. 4 is a diagram illustrating in detail the connection information of FIG. 3.

Referring to FIG. 4, the connection information manager 210 may include switch connection information manager 211 and a device connection information manager 212.

The switch connection information manager 211 may manage connection information between switches in the form of a link table.

Here, the form of a link table refers to the form of information that consists of a set of link entries which includes connection information between switches.

The link entries may include switch identifiers (IDs) of two connected switches and port numbers of both switches, as well as information about bandwidth designated to each port.

In this case, the switch may include a virtual switch, such as Open vSwitch, as well as a physical switch, and the port may include a virtual port, such as VXLAN port, as well as a physical port.

The device connection information manager 212 may manage the connection information between the switches and the virtual machines in the form of a device table.

The device table refers to the form of information that consists of a set of device entries which include connection information between switches and devices, and the device entries include device IDs of the respective devices and switch IDs and port numbers of switches connected to each device. As the device ID, a MAC address of each device may be used.

Figure 5:
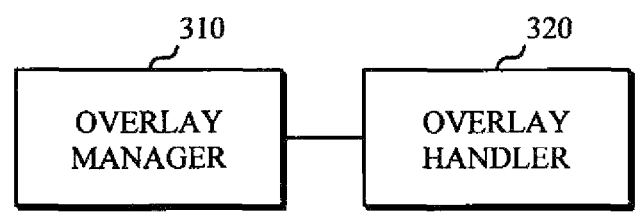
FIG. 5 is a diagram illustrating in detail the overlay tunnel controller of FIG. 2.

FIG. 5 is a diagram illustrating in detail the overlay tunnel controller of FIG. 2.

Referring to FIG. 5, the overlay tunnel controller 300 may include an overlay manager 310 and an overlay handler 320.

The overlay manager 310 may manage information about TEPs and create or update the mapping information between the virtual machines and the corresponding TEPs.

According to the exemplary embodiment, the overlay manager 310 may include a TEP table to manage the information about TEPs.

The TEP table will be described in detail below with reference to FIG. 8.

According to the exemplary embodiment, when a TEP is added to or removed from the network by using the TEP table, the mapping information may be created or updated.

The process executed by the overlay manager 310 when a TEP is added to or removed from the network will be described in detail with reference to FIGS. 9A and 9B.

The overlay handler 320 may create or remove an overlay tunnel between the TEPs according to the mapping information.

Figure 6:
FIG. 6 is a diagram illustrating in detail the overlay packet flow mapper of FIG. 2.

FIG. 6 is a diagram illustrating in detail the overlay packet flow mapper of FIG. 2.

Referring to. FIG. 6, the overlay packet flow mapper 400 may include an original packet flow extractor 410, a packet-in message parser 420, and a mapping information manager 430.

The original packet flow extractor 410 may extract the original flow from the received packet-in message.

According to the exemplary embodiment, when the SDN switch connected to the TEP receives a VXLAN packet, the SDN switch may transmit the packet-in message to the original packet flow mapping apparatus 1000 in order to forward the packet, and the original packet flow extractor 410 may extract the original flow from the received packet-in message.

The packet-in message parser 420 may generate the original packet flow information by parsing the received packet-in message.

According to the exemplary embodiment, the packet-in message parser 420 may parse the encapsulated packet and generate original packet flow information from a VXLAN header and an original packet header.

According to the exemplary embodiment, the packet-in message parser 420 may generate the original packet flow information by extracting original packet flow information and VNID in the VXLAN header, using an overlay packet parser.

The mapping information manager 430 may create the mapping information by mapping a packet flow in the physical network to the original packet flow, create a flow table by classifying the mapping information by type, and store or update the created flow table.

The mapping information manager 430 will be described in detail with reference to FIG. 7.

Figure 7:
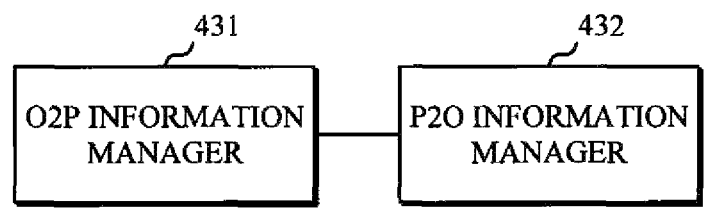
FIG. 7 is a diagram illustrating in detail the mapping information manager of FIG. 2.

FIG. 7 is a diagram illustrating in detail the mapping information manager of FIG. 2.

Referring to FIG. 7, the mapping information manager 430 may include an original2physical (O2P) information manager 431 and a physical2original (P2O) information manager 432.

The O2P information manager 431 may create mapping information between the original packet flow and a corresponding overlay packet flow in the physical network on which the overlay link is implemented, and the O2P information manager 431 may store or update an O2P flow table by reflecting the mapping information in the original flow.

The O2P flow table will be described in detail below with reference to FIG. 13A.

The P2O information manager 432 may create mapping information of the original flow corresponding to the overlay packet flow that passes through the physical network, and the P2O information manager 432 may store or update a P2O flow table by reflecting the mapping information in the original flow.

The P2O flow table will be described in detail below with reference to FIG. 13B.

FIG. 8 is a diagram illustrating a TEP table included in the overlay tunnel controller.

Referring to FIG. 8, the TEP forwards its ID, IP address, and MAC address to the original packet flow mapping apparatus 1000, and the forwarded information may be stored in the TEP table of the overlay tunnel controller 300, as shown in FIG. 5.

According to the exemplary embodiment, immediately upon boot-up, the SDN switches on the physical network, including a TEP, may perform a handshaking process with the original packet flow mapping apparatus 1000.

By doing so, the original packet flow mapping apparatus 1000 are able to recognize the switches on the physical network, and the switch operating as a TEP may be registered beforehand in the overlay tunnel controller 300 through an independent process, or may be registered in the overlay tunnel controller 300 through the handshaking process.

Figure 9A:
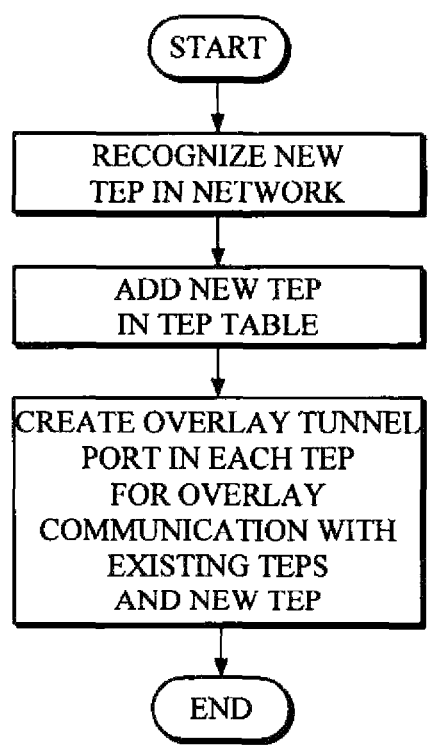
FIG. 9A is a flowchart illustrating a process of the overlay tunnel controller when a new TEP is added.

FIG. 9A is a flowchart illustrating a process of the overlay tunnel controller when a new TEP is added.

FIG. 9A illustrates the process of the overlay tunnel controller 300 when a new TEP is added to a network.

When the original packet flow mapping apparatus 1000 recognizes a new TEP on the network, the new TEP device may be added to the TEP table, and at this time, an IP address of the TEP device to be used for tunneling may be registered as well.

Thereafter, an overlay tunnel port may be created in each TEP for overlay communications between the existing TEPs and the new TEP, and at this time, the previously registered IP address of TEP may be used.

Figure 9B:
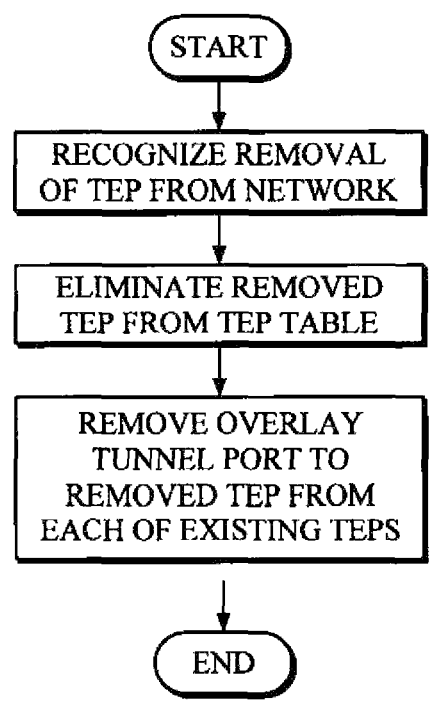
FIG. 9B is a flowchart illustrating a process of the overlay tunnel controller when the existing TEP is removed from the network.

FIG. 9B is a flowchart illustrating a process of the overlay tunnel controller when the existing TEP is removed from the network.

FIG. 9B illustrates the process of the overlay tunnel controller 300 when the existing TEP is removed from the network.

According to the exemplary embodiment, once the original packet flow mapping apparatus 1000 recognizes the removal of a TEP device from the network, the original packet flow mapping apparatus may eliminate information about the removed TEP from the TEP table, and also remove an overlay tunnel port to the removed TEP from each of the existing TEPs.

FIG. 10 is a diagram illustrating a virtual machine table stored in the overlay tunnel controller of FIG. 2.

Referring to FIG. 10, a structure of virtual machine table stored in the overlay tunnel controller 300 is shown.

According to the exemplary embodiment, the virtual machine table may include a MAC address value as a key value, which is assigned to a virtual interface of each virtual machine, and a VNID, a TEP IP address and a TEP MAC address filed which are mapped to the MAC address value.

The mapping relationship between a virtual machine and a VNID may be forwarded when a cloud controller creates the virtual machine, and at this time, mapping information between the virtual machine and the TEP may also be forwarded.

According to the exemplary embodiment, the mapping relationship between the virtual machine and the TEP may be forwarded together with the mapping relationship between the virtual machine and the VNID. Alternatively, the original packet flow mapping apparatus 1000 may manually obtain the mapping relationship from the packet-in message information.

That is, when a TEP that has received a packet through a virtual machine sends a packet-in message to the original packet flow mapping apparatus 1000, the original packet flow mapping apparatus 1000 may identify a TEP ID and a MAC address of the virtual machine from the packet-in message, wherein it may be indicated that the virtual machine of the identified MAC address is connected to a TEP associated with the TEP ID.

According to the exemplary embodiment, if virtual L2 segments are created in a cloud controller, such as an OpenStack, corresponding virtual machines included in the virtual L2 segments are created, and a virtual network interface of the virtual machine is connected to a specific virtual L2 segment, both MAC address information and VNID information assigned to the virtual machine may be forwarded to the original packet flow mapping apparatus 1000 via the interface 500 (e.g., REST API), and the overlay tunnel controller 300 may store the received information in the virtual machine table.

Figure 11A:
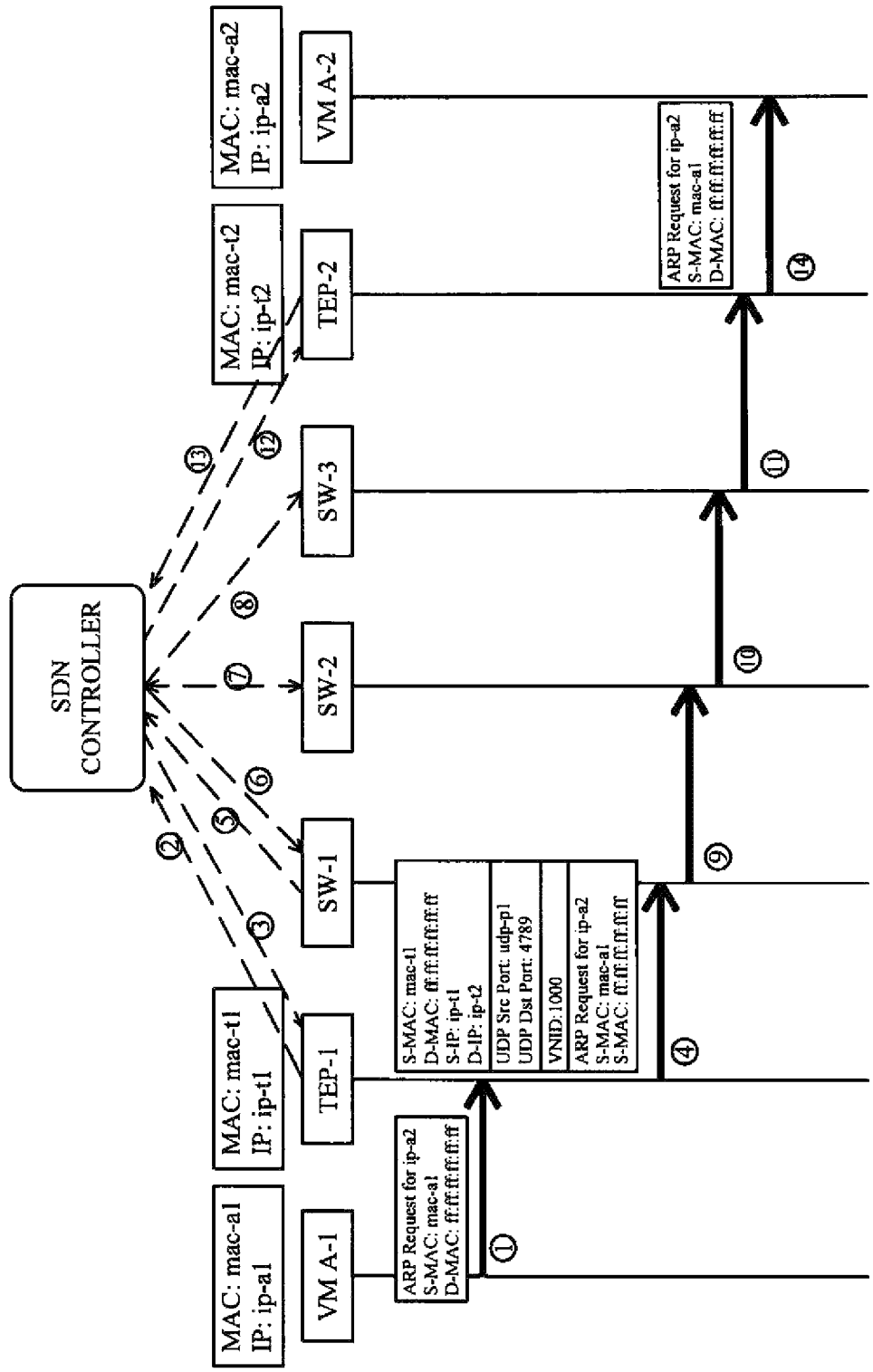
FIG. 11A is a diagram illustrating procedures for forwarding an address resolution protocol (ARP) request packet in an original packet flow mapping method based on the overlay network according to an exemplary embodiment.

FIG. 11A is a diagram illustrating procedures for forwarding an address resolution protocol (ARP) request packet in an original packet flow mapping method based on the overlay network according to an exemplary embodiment.

Referring to FIG. 11A, ARP procedures between TEPs are omitted, and under the assumption that flow tables of SDN-based TEPs TEP-1 and TEP-2 and switches SW-1, SW-2, and SW-3 are empty, the procedures for forwarding an ARP request packet in the original packet flow mapping method are as below.

① Virtual machine A-1 transmits an ARP request packet associated with an IP address ip-a2 of virtual machine A2.

② TEP-1 that has received the ARP request packet searches for a flow entry for said packet, and if fails, transmits a packet-in message to the original packet flow mapping apparatus 1000 to request the flow entry for processing the received packet.

③ The original packet flow mapping apparatus 1000 that has received the packet-in message recognizes that virtual machine A-1 corresponds to TEP-1, and searches a destination virtual machine table for a TEP that corresponds to virtual machine A-2, and creates a flow entry so as to forward the packet to a VXLAN virtual port connected to the found TEP and transmits the created flow entry to said TEP.

If virtual machine A-2 is not present in the virtual machine table, a destination MAC address of the ARP packet becomes ff:ff:ff:ff:ff:ff, which is a broadcast MAC address. So a flow entry is created to forward the packet to all VXLAN ports created in TEP-1.

The above exemplary embodiment assumes that the TEP also serves as an SDN switch that supports a virtual port for tunneling.

④ TEP-1 receives the flow entry from the original packet flow mapping apparatus 1000 and reflects the flow entry in the flow table included in the original packet flow mapping apparatus 1000, and transmits the received packet to the VXLAN virtual port designated by the flow entry. The VXLAN port that receives the packet encapsulates the packet into a VXLAN packet, and transmits the encapsulated packet to switch SW-1.

At this time, a UDP destination port number of the VXLAN packet is fixed to 4789, and a UDP source port number is determined according to the original packet flow.

In the exemplary embodiment, the port number may be determined based on four fields including the source and destination MAC addresses and source and destination IP addresses, but aspects of the present disclosure are not limited thereto, such that other fields may be added depending on equipment.

⑤ Switch SW-1 that has received the VXLAN packet performs flow table matching based on an outer header of the VXLAN packet, and if it fails to find a corresponding flow entry, switch SW-1 transmits a packet-in message to the original packet flow mapping apparatus 1000.

According to the exemplary embodiment, once the original packet flow mapping apparatus 1000 receives the packet-in message from switch SW-1 through the packet-in message receiver 100, the overlay packet flow mapper 400 thereof recognizes that the received packet is a VXLAN packet. Then, the original packet flow mapping apparatus 1000 extracts flow information of an original packet that contains a VNID and a UDP source port number by parsing the packet-in message, and reflects the flow information in the O2P table and the P2O table, each of which contains mapping information between the original packet flow and the physical network.

⑥-⑧ The flow controller 200 of the original packet flow mapping apparatus 1000 calculates a packet forwarding path based on the outer header of the VXLAN packet, and then transmits the flow entry to at least one switch SW-1, SW-2, and SW-3 that belongs to the calculated packet forwarding path.

⑨-⑪ The VXLAN packet is transmitted to the next node according to the forwarded flow entry.

⑫ TEP-2 that has received the VXLAN packet decapsulates said VXLAN packet to extract an original packet, searches the flow table for a matching flow entry, and if fails, transmits a packet-in message to the original packet flow mapping apparatus 1000 to request a flow entry of said VXLAN packet.

⑬ The original packet flow mapping apparatus 1000 recognizes that the received packet-in message is an ARP request packet, and it transmits a flow entry to TEP-2 such that TEP-2 transmits the packet only to the connected virtual machines that are associated with VNID 1000, such as virtual machine A-1.

⑭ TEP-2 transmits the packet to virtual machine A-2 according to the received flow entry.

Figure 11B:
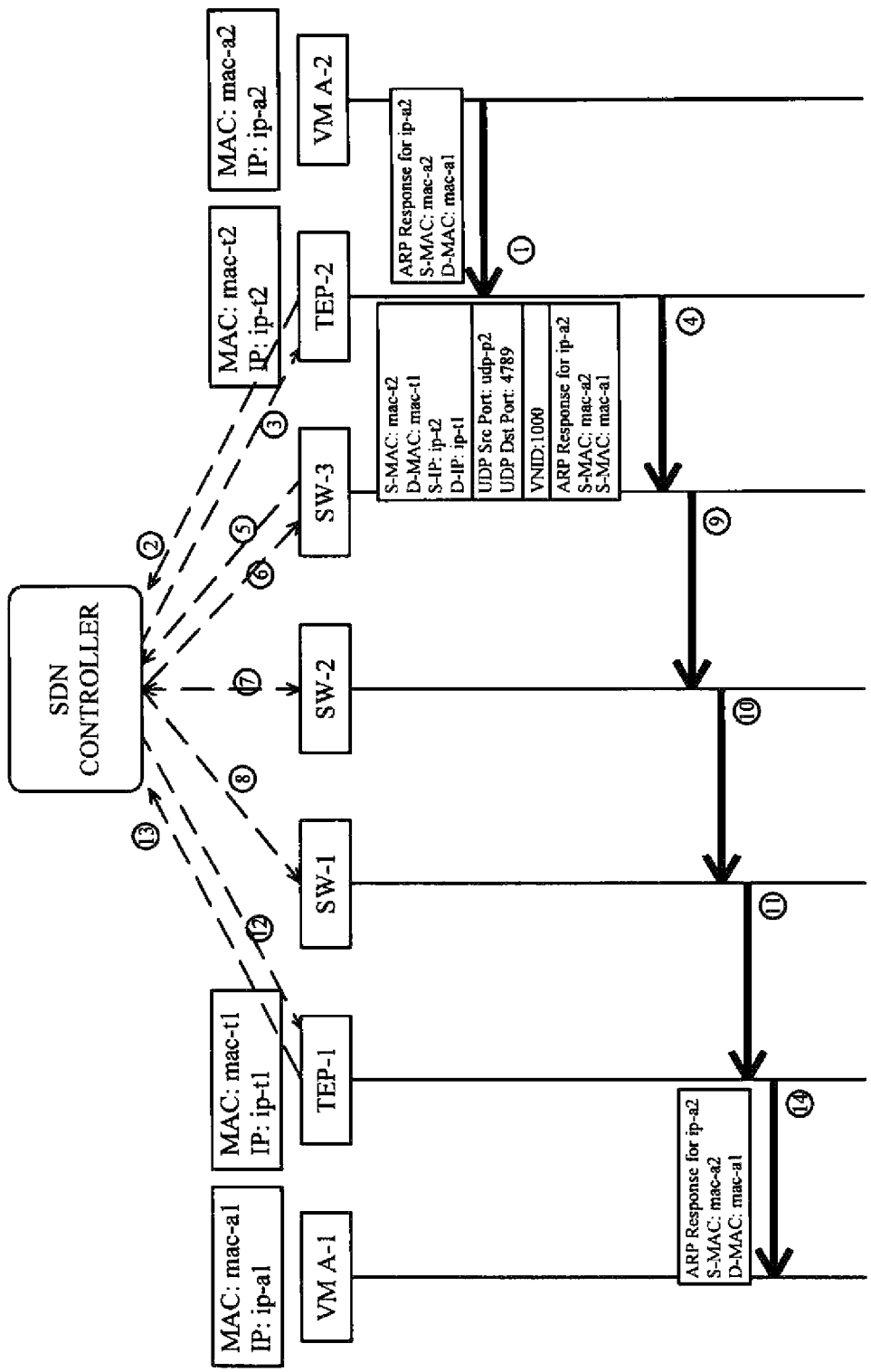
FIG. 11B is a diagram illustrating procedures for forwarding an ARP response packet in an overlay network-based original packet flow mapping method according to an exemplary embodiment.

FIG. 11B is a diagram illustrating procedures for forwarding an ARP response packet in an overlay network-based original packet flow mapping method according to an exemplary embodiment.

Referring to FIG. 11B, ARP procedures between TEPs are omitted, and under the assumption that flow tables of SDN-based TEPs TEP-1 and TEP-2 and SDN-based switches SW-1, SW-2, and SW-3 are empty, the procedures for forwarding an ARP response packet in the original packet flow mapping method are as below.

Referring to FIG. 11B, the procedures for forwarding the ARP response packet may be mostly the same as the procedures for forwarding the ARP request packet as shown in FIG. 11B.

According to the exemplary embodiment, when virtual machine A-2 transmits an ARP response packet, the relationship between virtual machine A-2 and TEP-2 is recognized by the original packet flow mapping apparatus 1000, and such recognition is reflected in the virtual machine table of the overlay tunnel controller 300.

In addition, as a destination MAC address of the ARP response packet is set to mac-al, which is a MAC address of virtual machine A-1, not a broadcast address, TEP-2 can transmit the packet only through a VXLAN port that is connected to TEP-1.

Figure 12A:
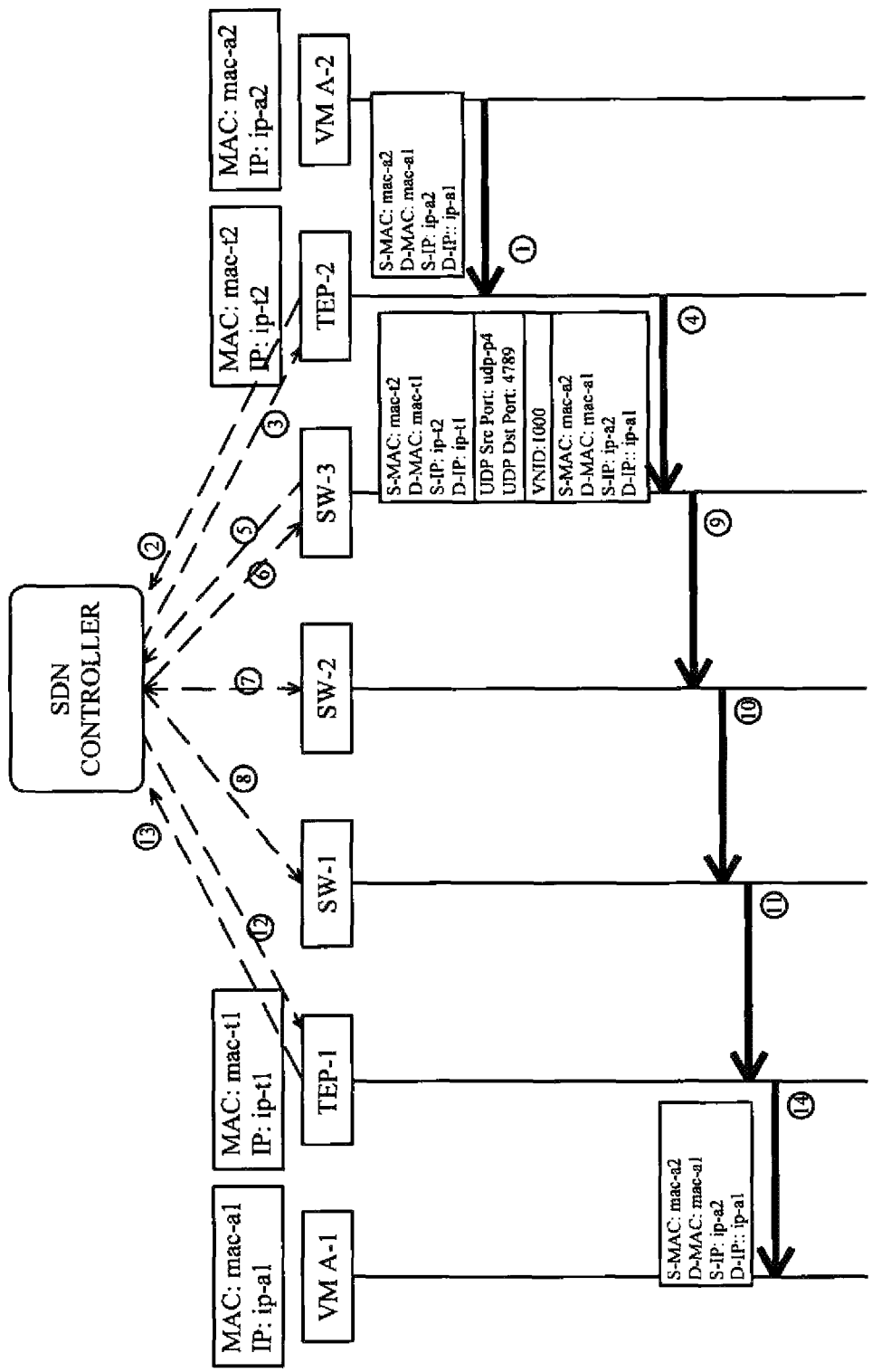
FIG. 12A is a diagram illustrating procedures for exchanging a packet from virtual machine A-1 to virtual machine A-2 after the completion of ARP procedures in the overlay network-based original packet flow mapping method.
Figure 12B:
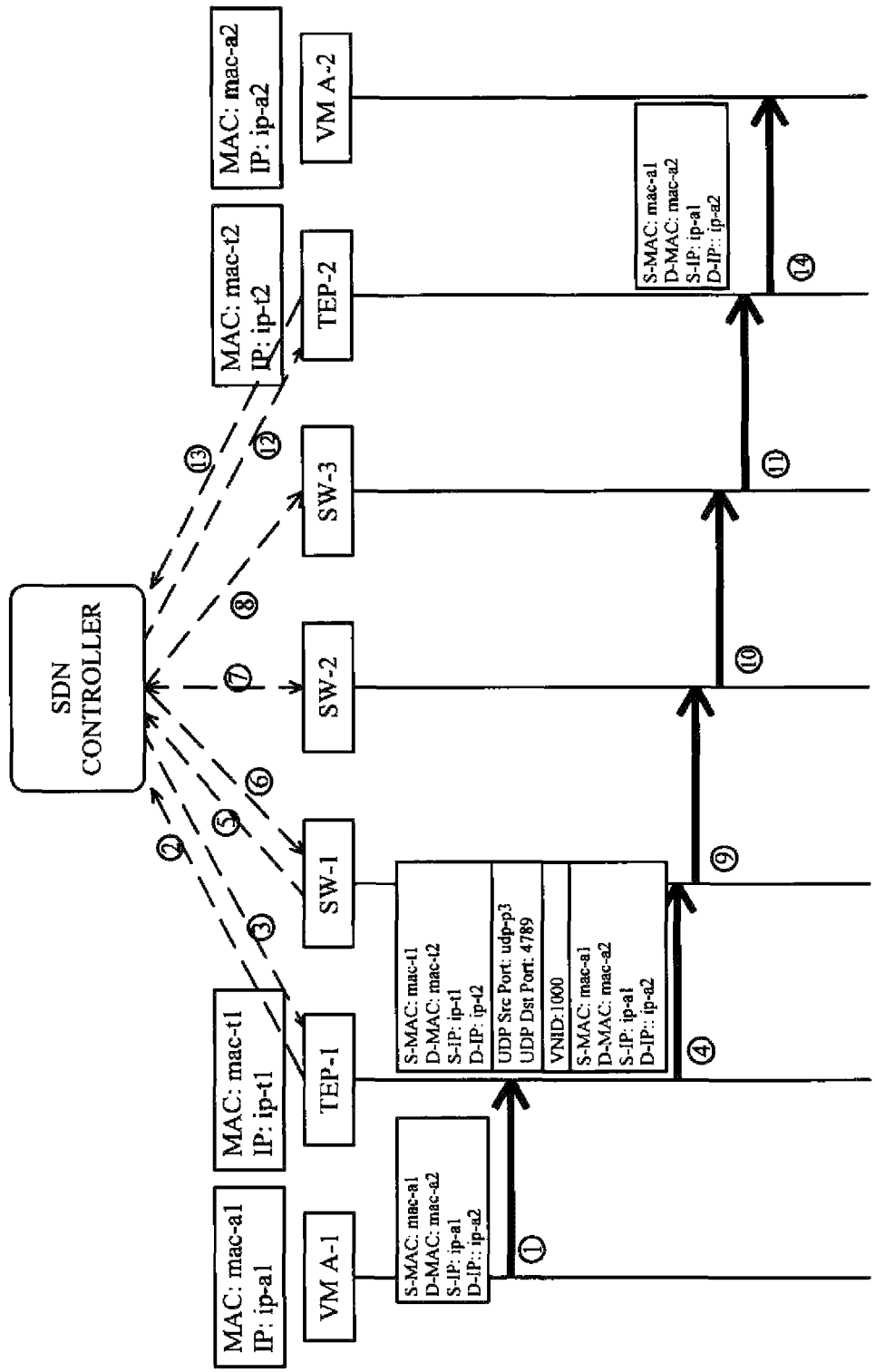
FIG. 12B is a diagram illustrating procedures for exchanging a packet from virtual machine A-2 to virtual machine A-1 after the completion of ARP procedures in an overlay network-based original packet flow mapping method.

FIGS. 12A and 12B are diagrams illustrating procedures for exchanging packets between virtual machines A-1 and A-2 after the completion of ARP procedures (in FIG. 12A, A1→A2; and in FIG. 12B, A2→A1).

FIG. 12A is a diagram illustrating procedures for exchanging a packet from virtual machine A-1 to virtual machine A-2 after the completion of ARP procedures in the overlay network-based original packet flow mapping method. FIG. 12B is a diagram illustrating procedures for exchanging a packet from virtual machine A-2 to virtual machine A-1 after the completion of ARP procedures in an overlay network-based original packet flow mapping method.

According to the exemplary embodiment, the procedures for exchanging packets between the virtual machines after the completion of ARP procedures may proceed in the same way as the procedures for forwarding the ARP packet shown in FIGS. 11A and 11B.

However, if the flow information of the original packet is changed, the UDP source port number may also be altered when the packet is encapsulated to a VXLAN packet.

That is, both an ARP request packet (refer to FIG. 11A) to be transmitted from virtual machine A-1 to virtual machine A-2 and a general IP packet (refer to FIG. 12A) are forwarded passing through TEP-1 and TEP-2, while the UDP source port numbers may be differently designated.

FIG. 13A is a diagram illustrating an O2P flow table according to an exemplary embodiment, and FIG. 13B is a diagram illustrating a P2O flow table according to an exemplary embodiment.

According to the exemplary embodiment, when an original packet is encapsulated to a VXLAN packet by a TEP, an outer UDP source port number may be differently designated according to a flow of the original packet.

According to the exemplary embodiment, the UDP source port number of the VXLAN packet may be determined according to four field values, such as a source MAC (S-MAC), destination MAC (D-MAC), source IP (S-IP), and destination IP (D-IP), but aspects of the present disclosure are not limited thereto, such that the UPD source port number may be varied according to a type of TEP.

Types of packet header field to be reflected in the O2P flow table and the P2O flow table may be varied according to a type of TEP, as shown in FIGS. 13A and 13B.

According to the exemplary embodiment, the SDN switch connected to the TEP may transmit a packet-in message to the original packet flow mapping apparatus 1000 in order to forward a received VXLAN packet.

If a packet of the received packet-in message is a VXLAN packet, the overlay packet flow mapper 400 may extract VNID and flow information of the original packet, using a packet parser, and then store the extracted flow information in both the O2P table and the P2O table.

According to the exemplary embodiment, the O2P table may include mapping information between the original packet flow and a corresponding overlay packet flow in the physical network on which the overlay link is implemented, and inversely, the P2O table may include the original flow that corresponds to the overlay packet that passes through the physical network.

According to the exemplary embodiment, only when a new flow is generated, the decapsulation of the VXLAN packet may be performed with respect to the very first packet-in message forwarded to the original packet flow mapping apparatus 1000, and the decapsulation may not take place any longer for the following packet-in messages, since the entries for the corresponding packet flows are already present in the P2O table and the O2P table.

According to the exemplary embodiment, in the case where the virtual machine disappears from the network or is connected to another TEP as it is migrated to a different physical server, the original packet flow mapping apparatus 1000 that recognizes such change may remove all flow entries mapped with the pertinent virtual machine from each table.

According to the exemplary embodiment, in the case where a virtual machine is migrated, a new flow may be generated in the virtual machine, and mapping information between the original flow and an encapsulated packet flow on a physical network may be created through the aforesaid procedures.

According to the exemplary embodiment, the original packet flow mapping apparatus 1000 may transmit or receive information about the migration of the virtual machine to a different physical server to or from a cloud controller, or the original packet flow mapping apparatus 1000 may recognize such migration when a packet-in message from the migrated virtual machine arrives at said apparatus 1000.

According to the exemplary embodiment, the O2P table and the P2O table may be provided to be applied to an SUN that exists external to the original packet flow mapping apparatus 1000.

According to the exemplary embodiment, an SDN application module may identify a flow for each virtual segment in an overlay link segment on a physical network, based on the information included in the O2P table and the P2O table.

Accordingly, various networking services, such as a network monitoring service for each virtual network, packet forwarding or routing based on policies for each virtual network, and security service like firewall for each virtual network, are available in an overlay segment. In this regard, to provide a variety of networking services, an overlay link may be implemented on a physical network segment based on end-to-end connectivity.

According to the above exemplary embodiments, when an overlay-based virtualization method, such as VXLAN, is used for network virtualization in a cloud environment, flows may be identified even in a physical network segment on which an overlay link is implemented and then mapped to an original flow, so that various networking services can be implemented even in said physical network based on end-to-end connectivity.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An original packet flow mapping apparatus based on an overlay network, comprising:
   a packet-in message receiver configured to receive a packet-in message using a communication protocol;
   in response to receipt of various requests, the requests including one of a request for collecting network status information regarding topology and traffic, a request for path control for a specific flow, a request for creation of a virtual network, or a request for virtual machine information,
   a flow controller configured to manage connection information between switches or between virtual machines and switches using a link table, to calculate a forwarding path based on the packet-in message using a header in response to detection of the received packet-in message, and
   to transmit a flow entry which corresponding to a flow included in the link table to at least one switch belonging to the packet forwarding path, according to the connection information;
   an overlay tunnel controller configured to manage at least one piece of mapping information between tunnel end points (TEPs) and at least one piece of mapping information between a virtual machine and a TEP, and to create or to remove an overlay tunnel between TEPs according to the mapping information; and an overlay packet flow mapper circuit configured to receive an encapsulated packet-in message, to extract original flow or original packet flow information from the encapsulated packet-in message, and to create mapping information by mapping an original packet flow to the corresponding packet flow on which an overlay link is implemented and a physical network.

2. The original packet flow mapping apparatus of claim 1, wherein the flow controller manages topologies and devices connected to switches and sets up forwarding rules.

3. The original packet flow mapping apparatus of claim 1, wherein the flow controller comprises:
   a connection information manager circuit configured to include a link table to manage connection information between switches and a device table to manage connection information between switches and virtual machines,
   a path calculator circuit configured to calculate the packet forwarding path that includes at least one switch, using a header of the received packet-in message, and
   a flow handler circuit configured to transmit the flow entry corresponding to a flow included in the link table or the device table to at least one switch belonging to the packet forwarding path.

4. The original packet flow mapping apparatus of claim 3, wherein the connection information manager circuit comprises a switch connection information manager circuit configured to manage the connection information between switches in the form of a link table, and a device connection information manager circuit configured to manage the connection information between switches and virtual machines in the form of a device table.

5. The original packet flow mapping apparatus of claim 1, wherein the overlay tunnel controller comprises:
   an overlay manager circuit configured to manage information about TEPs and create or update the mapping information between the virtual machine and the TEP corresponding to the virtual machine; and
   an overlay handler circuit configured to create or remove the overlay tunnel between TEPs according to the mapping information.

6. The original packet flow mapping apparatus of claim 1, further comprising:
   an original packet flow extractor circuit configured to extract the original flow from the received packet-in message;
   a packet-in message parser circuit configured to generate the original packet flow information by parsing the received packet-in message; and
   a mapping information manager circuit configured to create the mapping information by mapping a packet flow of the physical network to the original packet flow, create a flow table by classifying the mapping information by type, and store or update the created flow table.

7. The original packet flow mapping apparatus of claim 6, wherein the mapping information manger circuit comprises an originaltophysical (OtoP) information manager circuit configured to create mapping information between the original packet flow and a corresponding overlay packet flow in the physical network on which an overlay link is implemented, and store or update an OtoP flow table by reflecting the mapping information in the original flow, and a physicaltooriginal (PtoO) information manager circuit configured to create mapping information of an original flow corresponding to an overlay packet flow that passes through the physical network, and store or update a PtoO flow table by reflecting the mapping information in the original flow.

8. A computer-implemented original packet flow mapping method based on an overlay network, comprising:
   receiving a packet-in message using a communication protocol;
   in response to receipt of various requests, the requests including one of a request for collecting network status information regarding topology and traffic, a request for path control for a specific flow, a request for creation of a virtual network, or a request for virtual machine information,
   managing connection information between switches or between virtual machines and switches using a link table, calculating a forwarding path based on the packet-in message using a header in response to detection of the received packet-in message, and transmitting a flow entry which corresponding to a flow included in the link table to at least one switch belonging to the packet forwarding path, according to the connection information;
   managing at least one piece of mapping information between tunnel end points (TEPs) and at least one piece of mapping information between a virtual machine and a TEP, and creating or removing an overlay tunnel between TEPs according to the mapping information; and
   receiving an encapsulated packet-in message, extracting original flow or original packet flow information from the encapsulated packet-in message, and creating mapping information by mapping an original packet flow to the corresponding packet flow on which an overlay link is implemented and a physical network.

9. The original packet flow mapping method of claim 8, wherein the transmitting of the flow entry comprises managing topologies and devices connected to switches and setting up forwarding rules.

10. The original packet flow mapping method of claim 8, wherein the transmitting of the flow entry comprises:
    including a link table to manage connection information between switches and a device table to manage connection information between switches and virtual machines;
    calculating the packet forwarding path that includes at least one switch by using a header of the received packet-in message; and
    transmitting the flow entry corresponding to a flow included in the link table or the device table to at least one switch belonging to the packet forwarding path.

11. The original packet flow mapping method of claim 10, wherein the including of the device table comprises managing the connection information between switches in the form of a link table, and managing the connection information between switches and virtual machines in the form of a device table.

12. The original packet flow mapping method of claim 8, wherein the creating or removing of the overlay tunnel comprises:
    managing information about TEPs and creating or updating the mapping information between the virtual machine and the TEP corresponding to the virtual machine; and
    creating or removing the overlay tunnel between TEPs according to the mapping information.

13. The original packet flow mapping method of claim 8, wherein the creating of the mapping information comprises:

extracting the original flow from the received packet-in message;

generating the original packet flow information by parsing the received packet-in message; and creating the mapping information by mapping a packet flow of the physical network to the original packet flow, creating a flow table by classifying the mapping information by type, and storing or updating the created flow table.

14. The original packet flow mapping method of claim 13, wherein the storing or updating of the flow table comprises:

creating mapping information between the original packet flow and a corresponding overlay packet flow in the physical network on which an overlay link is implemented, and storing or updating an original2physical (OtoP) flow table by reflecting the mapping information in the original flow; and creating mapping information of an original flow corresponding to an overlay packet flow that passes through the physical network, and storing or updating a physicaltooriginal (PtoO) flow table by reflecting the mapping information in the original flow.

* * * * *